United States Patent [19]

Bluen et al.

[11] Patent Number: 5,424,592
[45] Date of Patent: Jun. 13, 1995

[54] ELECTROMAGNETIC TRANSDUCER

[75] Inventors: Jeffrey Bluen, Studio City; Dennis C. Bulgatz, Reseda; Drew Kallen, Buena Park, all of Calif.

[73] Assignee: Aura Systems, Inc., El Segundo, Calif.

[21] Appl. No.: 86,622

[22] Filed: Jul. 1, 1993

[51] Int. Cl.6 ............................................. H02K 33/12
[52] U.S. Cl. ........................................ 310/28; 310/15; 310/17
[58] Field of Search .............................. 310/15, 17, 28

[56] References Cited

U.S. PATENT DOCUMENTS 4,883,977 11/1989 Regan .................... 307/401
4,912,343 3/1990 Stuart .................... 310/14

Primary Examiner—Thomas M. Dougherty
Assistant Examiner—Judson H. Jones
Attorney, Agent, or Firm—Anthony T. Cascio; Lisa A. Merkadeau

[57] ABSTRACT

An improved electromagnetic actuator includes a first assembly, a second assembly disposed for relative movement with respect to the first assembly and at least a first flexure interconnecting the first assembly and the second assembly. The first assembly includes a core having a first magnetic pole of a first polarity in a second magnetic pole of a second polarity. The second assembly includes an electrical current conductive coil having a first coil portion and a second coil portion. The first magnetic pole is in a facing relationship to the first coil portion and the second magnetic pole is in a facing relationship to the second coil portion. The first coil portion and the second coil portion are arranged so that an electrical current in the coil develops additive flux current cross products at each of the first coil portion and the second coil portion. One of the first assembly and the second assembly includes a magnetic flux return path between the first coil portion and the second coil portion.

12 Claims, 2 Drawing Sheets

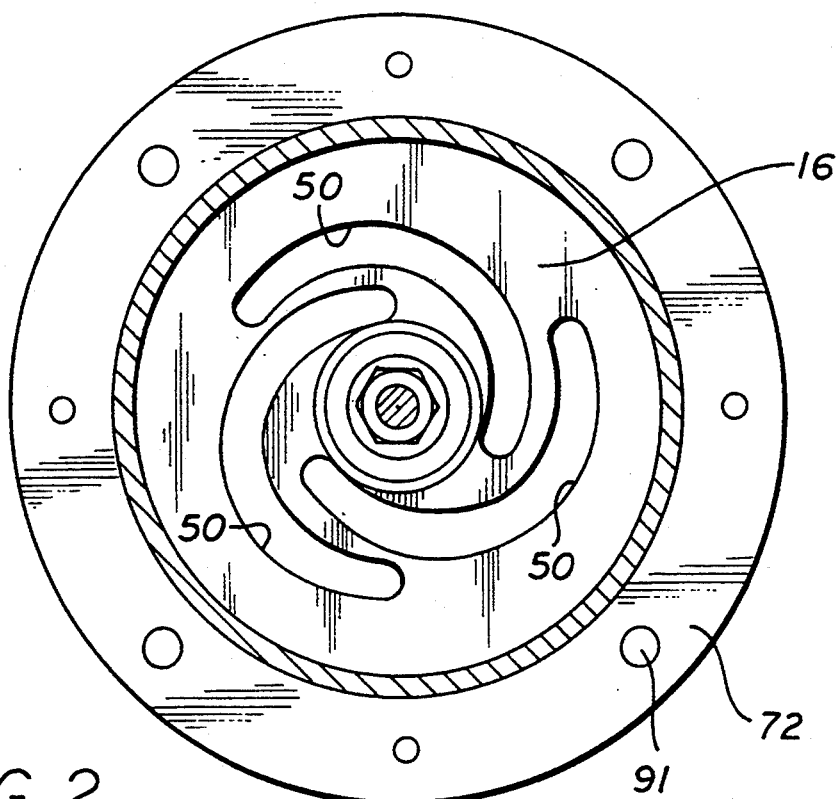
FIG. 2
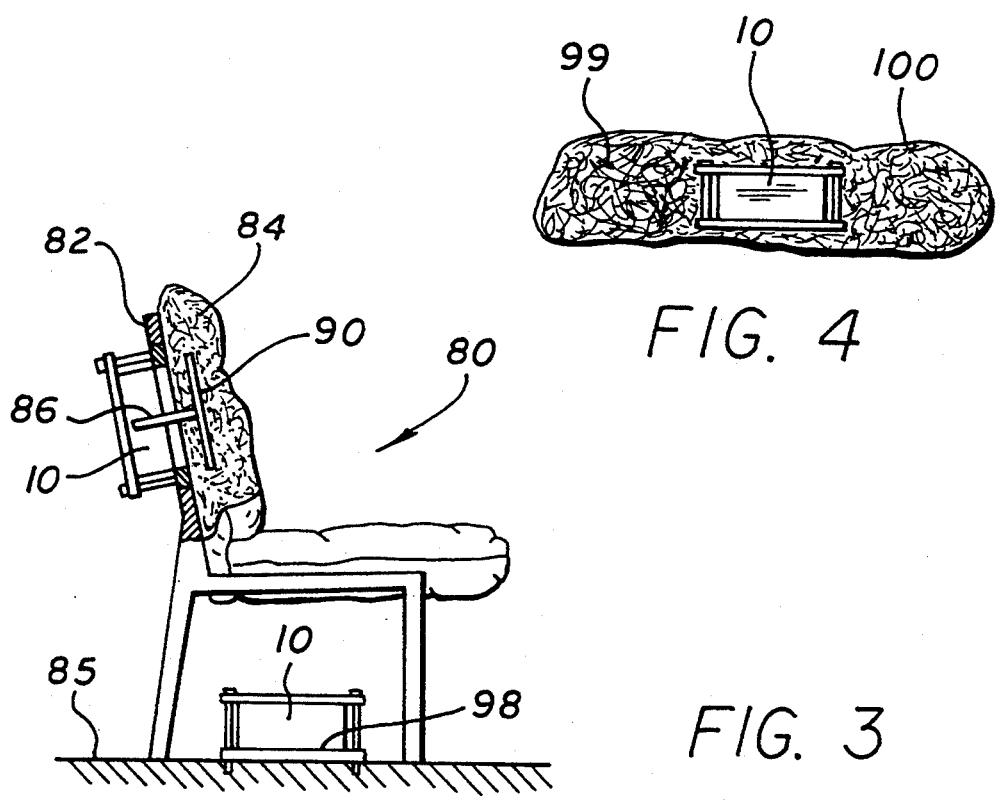
FIG. 4
FIG. 3

ELECTROMAGNETIC TRANSDUCER

FIELD OF INVENTION

The present invention relates generally to electromagnetic actuators and more particularly to novel vibratory transducer.

BACK OF THE INVENTION

A vibratory transducer is one type of an electromagnetic actuator which develops a mechanical vibratory or oscillatory output in response to an electrical input current to the transducer. Such vibratory transducers have many applications in commerce. One such application is to inpart a vibrating sensation within an article of furniture which is then sensed by a person sitting therein. For example, the input current to the transducer may be developed from an audio channel of a sound system. The vibrations developed by the transducer will be sensed through the body of the person sitting in the article of the furniture.

There are several known prior art systems incorporating transducers in an article of furniture. In one known prior art system, the transducer is a conventional voice coil actuator, or speaker motor, with the cone of the speaker replaced by a sounding board. The voice coil motor and sounding board are placed within the cushion of the article of furniture. The actuation of the sounding board is actuated linearly with the audio signal applied to the voice coil motor. Therefore, this prior art system produces audible sound. Any perceived vibration would occur in the high frequencies. A disadvantage and limitation of this prior art system is that high frequency vibrations are not readily perceived by the body (exclusive of the ear).

Another prior art system utilizes a momentum transfer transducer attached to the frame rails of an article of furniture. The transducer is also driven by an audio signed. A disadvantage and limitation of this prior art system is that the vibration imparted to the frame of the article in furniture is attenuated by the cushioning of the furniture thereby lessening the effect sensed by a person sitting in such furniture.

In the latter described prior art system, the transducer has a flexure aligned along a radial plane with a magnetic gap in the transducer magnetic circuit. The purpose of the flexure alignment is to ensure that the coil traversed a true axial path. However, failure of the flexure would cause the axis of the coil to tilt with respect to the axis of the magnetic core, thereby causing the coil to "crash" into the core of the transducer.

SUMMARY OF THE INVENTION

It is therefore an object of the present invention to overcome one or more disadvantages and limitations of the prior art enumerated above. The further object of the present invention to provide an improved electromagnetic transducer design which may be used as a vibratory transducer. It is still a further object of the present invention to provide an improved system for imparting vibrations within an article of the furniture.

According to the present invention, improved electromagnetic transducer includes a first assembly, a second assembly disposed for relative movement with respect to the first assembly and at least a first flexure interconnecting the first assembly and the second assembly. The first assembly includes a core having a first magnetic pole of a first polarity in a second magnetic pole of a second polarity. The second assembly includes an electrical current conductive coil having a first coil portion and a second coil portion. The first magnetic pole is in a facing relationship to the first coil portion and the second magnetic pole is in a facing relationship to the second coil portion. The first coil portion and the second coil portion are arranged so that an electrical current in the coil develops additive flux current cross products at each of the first coil portion and the second coil portion. One of the first assembly and the second assembly includes a magnetic flux return path between the first coil portion and the second coil portion.

These and other object, advantages and features of the present invention will become readily apparent to those skilled in the art from a study of the following description of an exemplary preferred embodiment of the present invention when read in conjunction with the attached drawings and appended claims.

BRIEF DESCRIPTION OF THE DRAWING

FIG. 2 is a cross-sectional view taken along line 2—2 of FIG. 1;

FIG. 3 illustrates the transducer of FIG. 1 in two separate applications in conjunction with an article of furniture; and FIG. 4 illustrates the transducer of FIG. 1 in a foam cushion pillow.

DESCRIPTION OF AN EXEMPLARY PREFERRED EMBODIMENT

Figure 1:
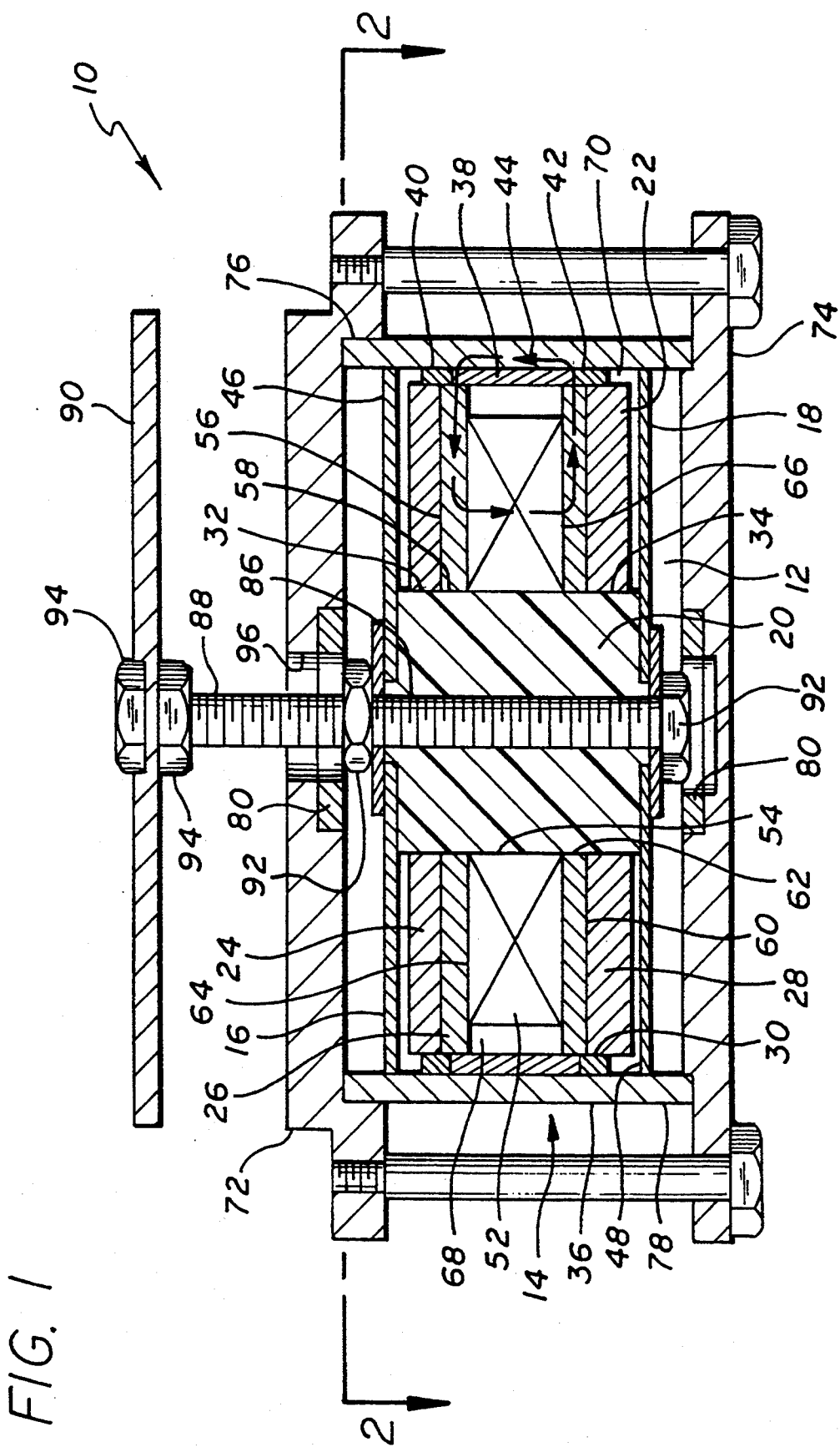
FIG. 1 is a cross-sectional view of an improved transducer constructed in accordance with the principals of the present invention, showing such actuator with an attached pusher plate useful in one embodiment of the present invention.

Referring now to FIG. 1, there is shown an electromagnetic transducer 10 constructed according to the principals of the present invention. The transducer 10 includes a first assembly 12, a second assembly 14, a first flexure 16 and a second flexure 18. The second assembly 14 is disposed for relative movement with respect to the first assembly 12. As described in greater detail hereinbelow, at least the first flexure 16 is used to interconnect the first assembly 12 and the second assembly 14. In a more particular embodiment of the present invention, as hereinbelow described, the second flexure 18 is also used to interconnect the first assembly 12 to the second assembly 14.

The transducer 10 as described herein is particularly useful as a vibrator transducer or shaker. The first flexure 16 and the second flexure 18 each act like springs in that they develop a force which opposes the relative movement the second assembly 14 from its normally biased position with respect to the first assembly 12. Thus, as an electrical current is applied to the transducer the second assembly 14 will be displaced relative to the first assembly 12 with the first flexure 16 and the second flexure 18 opposing such displacement. If the input current is of an alternating nature, the second assembly 14 will vibrate. The frequency of such vibration will be centered about a natural frequency as determined by the mass of the second assembly 14 and the combined spring constant of the first flexure 16 and the second flexure 18. In one particular embodiment of the present invention, this natural frequency may be tuned to the base or sub-base of the audio spectrum to enhance the sound quality of the base and sub-base in an audio sound system by imparting such low frequency vibrations through an article of furniture to a person sitting in such article of furniture.

More particularly, the first assembly 12 includes a non-magnetic material core carrier 20 and a generally cylindrical core 22 carried by the core carrier 20. The core 22 has a first core end 24 at which a first magnetic pole 26 of a first magnetic polarity is disposed and a second core end 28 at which a second magnetic pole 30 of a second magnetic polarity is disposed. The first pole 26 and the second pole 28 are radially disposed with respect to the core 22. The core carrier 20 has a first carrier end portion 32 extending axially outwardly from the first core end 24 and a second carrier end portion 34 extending axially outwardly from the second core end 28 as best seen in FIG. 1.

The second assembly 14 is coaxially disposed within the first assembly 12. The second assembly 14 includes a generally cylindrical magnetic flux conductive material case 36 and an electrical current conductive coil 38 disposed within the case 36 an intimate contact thereto. The coil 38 has a first coil portion 40 and a second coil portion 42. The first pole 26 is in a facing relationship to the first coil portion 40 in the second pole 38 is in a facing relationship to the second coil portion 42. The case 36 forms a magnetic flux return path 44 between the first coil portion 40 and the second coil portion 42. The first coil portion 40 and the second coil portion 42 are arranged so that an electrical current in the coil 38 develops additive flux current cross products at each of the first coil portion 40 and the second coil portion 42. The length of case 36 is axially commensurate with the length of the core carrier 20.

The first flexure 16 is attached to the first carrier end portion 32. The second flexure 18 is attached to the second carrier end 34. Each of the first flexure 16 and the second flexure 18 are carried by the case. More particularly, the case 36 has a first annular rib 46 and a second annular rib 48. The first flexure 16 is carried by the first rib 46 and similarly, the second flexure is carried by the second rib 48 as best seen in FIG. 1. As best seen in FIG. 2, each of the first flexure 16 and the second flexure 18 have one or more spiral cut openings 50 therein to enhance flexing and imparting spring-like force between the first assembly 12 and the second assembly 14.

The core 22 includes an axially polarized magnet 52 having an axially opening 54 there through, a first generally disk shaped pole piece 56 having an axially opening 58 there through and a second generally disk shaped pole piece 60 having an axially opening 62 there through. The coil carrier 20 is disposed to the opening 54, 58, 62 of each of the magnet 52, the first pole piece 56 and the second pole piece 60.

The magnet 52 has a first face 64 and a second face 66. The first pole piece 56 is disposed on the first face 64 of the magnet 52. The first pole piece 56 further has an edge portion 68 extending radially outward from the magnet 52. Similarly, the second pole piece 60 is disposed on the second face 66 of the magnet 52. The second pole piece 60 further has an edge portion 70 extending radially outwardly from the magnet 52. The first pole 26 and the second pole 30 are each disposed at the edge portion 68, 70 of a respective one of the first pole piece 56 and the second piece 60.

The case 36 may further include a first end cap 72 and a second end cap 74. The first end cap is disposed at a first end 76 of the case 36 and the second end cap 74 is disposed at a second end 78 of the case 36. Each of the first end cap 72 and the second end cap 74 may include an elastomeric bumper 80 to limit extreme axially movement of the first assembly 12.

The transducer 10 is described herein above with reference to one particular preferred embodiment thereof. Other embodiments of the transducer 10 may have the first assembly 12 comprised of both the core 22 and the case 36 to form a complete magnetic circuit and the second assembly 14 would include the coil 38. Furthermore, the actuator 10 may not be of the symmetrical cylindrical construction as set forth hereinabove, but any structure which allows two magnetic flux paths to pass in opposite directions through a coil and have the coil arranged so that the flux current cross products are additive is within the scope of the present invention.

An advantage of the present invention is provided by the first flexure 16 and second flexure 18. Because the opposing spring force developed by each of the first flexure 16 and second flexure 18 is distributed so that the net force acting between the first assembly 12 and the second assembly 14 is coaxially along an axis of relative movement there between. The first flexure 16 and the second flexure 18 act at opposite ends of the transducer 10 to maintain such a balance. In the prior art transducer, a misalignment of the force of the fluxtured core planer with the magnetic gap will cause the coil of the prior art transducer to tilt relative to the axis of the magnetic circuit thereby causing the coil to crash into the magnetic circuit.

The above-described transducer 10 is useful in many applications requiring vibrators or shakers. Once such application is to provide the vibratory sensation within a portable cushion or cushion of a theatre seat to enhance the base and sub-base qualities of the audio.

Referring now to FIG. 3, there is shown an article of furniture, such as a theatre seat 80 having a generally rigid shell 82 and a foam cushion 84. The theatre seat 80 is affixed to a floor 85 of the theatre. The shell 82 is typically a wood back disposed between metal frame rails of the theatre seat. However, any material may be used for the shell 82.

The transducer 10 has its case 36 attached to the shell 82. The first end cap 72 has a flange 87 and the second end cap 74 has a flange 89. Each flange has several axial openings 91 through which attachment of the case 36 to other devices may be made and also to serve each end cap 72, 74 to each other. To impart vibration within the seat, the transducer 10 includes an elongated output shaft 86. Attached to a distal end 88 of the output shaft 86 is a pusher plate 90. The pusher plate 90 is disposed within the foam of the cushion 84 which is adjacent the shell 82.

The output shaft 86 may be a continuously threaded shaft disposed through the core carrier 20. The threaded shaft 86 will then be used to secure the first flexure 16 and second flexure 18 to the core carrier through a first pair of nuts 92, as best seen in FIG. 1. The pusher plate 90 is then attached to the distal end 88 of the shaft 86 through a second pair of nuts 94. In this embodiment of the present invention, the first end cap 72 includes an opening 96 therethrough in which the shaft 86 is disposed. However, the transducer 10 does not need any external output shaft. In such embodiment, the shaft 86 is truncated at the nut securing the first flexure 16 to the coil carrier 20. Therefore, no opening 96 would be required in the first end cap 72.

For the latter described embodiment, the transducer 10 may then be attached to the floor 85 of the theatre. To make such attachment, elastomeric bushing 98 is disposed between the transducer 10 and the floor 85. The transducer 10, either in the seat 82 or the floor 85 may then have a current applied to its coil 38 developed from the audio channel of the performance.

The transducer 10 may also be disposed in the foam cushion 99 of a portable pillow 100 for use in the home. Such embodiment need not use the pusher plate 90.

There has been described above a novel transducer 10 constructed according to the principals of the invention as described with reference to an exemplary preferred embodiment thereof. Those skilled in the art may now make numerous uses and departures from the above-described embodiments without departing from the inventive concepts disclosed herein. Accordingly, the present invention is to be defined solely by the scope of the following claims.

What we claim is:

1. An electromagnetic transducer comprising:
   a first assembly including a core, said core having a first magnetic pole of a first polarity and a second magnetic pole of a second polarity;
   a second assembly disposed for relative movement with respect to said first assembly, said second assembly including an electrical current conductive coil, said coil having a first portion and a second portion, said first magnetic pole being in a facing relationship to said first portion and said second magnetic pole being in a facing relationship to said second portion, said first portion and said second portion being arranged so that an electrical current in said coil develops additive flux current cross-products at each of said first portion and said second portion, one of said first assembly and said second assembly having a magnetic flux return path;
   at least a first flexure interconnecting said first assembly and said second assembly.

2. A transducer as set forth in claim 1 wherein said second assembly includes a magnetic flux material case, said coil being disposed in intimate contact with said case, said flux return path being within said case between said first portion and said second portion.

3. A transducer as set forth in claim 1 wherein said core includes a permanent magnet, a first pole piece and a second pole piece, said permanent magnet having a first face of said first polarity and a second face of said second polarity, said first pole piece being disposed adjacent said first face and said second pole piece being disposed adjacent said second face, said first pole being at said first pole piece and said second pole being at second pole piece.

4. A transducer as set forth in claim 1 wherein said actuator further comprises a second flexure, said first flexure being disposed proximate said first pole piece and said second flexure being disposed proximate said second pole piece.

5. A transducer as set forth in claim 1 wherein said second assembly is adapted for fixed mounting in said first assembly is adapted for connection to an external actuated device.

6. A transducer as set forth in claim 1 wherein said second assembly is adapted for fixed mounting and said first assembly is confined within said second assembly.

7. An electromagnetic transducer comprising:
   a first assembly including a non-magnetic material core carrier and a generally cylindrical core carried by said carrier, said core having a first core end at which a first magnetic pole of a first magnetic polarity is disposed and a second core end at which a second magnetic pole of a second magnetic polarity is disposed, said first pole and said second pole being radially disposed with respect to said core, said carrier having a first carrier end portion extending axially outwardly from said first core end and a second carrier end portion extending axially outward from said second core end;
   a second assembly disposed for relative movement with respect to said first assembly, said first assembly being coaxially disposed within said second assembly, said second assembly including a generally cylindrical magnetic flux conductive material case and an electrical current conductive coil disposed within said case in intimate contact thereto, said coil having a first coil portion and a second coil portion, said first pole being in a facing relationship to said first coil portion and said second pole being in a facing relationship to said second coil portion, said case forming a magnetic flux return path between said first coil portion and said second coil portion, said first coil portion and said second coil portion being arranged so that an electrical current in said coil develops addictive flux current cross-products at each of said first coil portion and said second coil portion, said case being axially commensurate with said core carrier; and
   a first flexure and a second flexure, said first flexure being attached to said first carrier and carried by said case and said second flexure being attached to said second carrier end and carried by said case.

8. A transducer as set forth in claim 7 wherein said case has a first annular rib and a second annular rib, said first flexure being carried by said first rib and said second flexure being carried by said second rib.

9. A transducer as set forth in claim 8 wherein said first flexure and said second flexure each have at least one spiral cut opening therein.

10. A transducer as set forth in claim 7 wherein said core includes an axially polarized magnet having an axially opening there through, a first generally disk shaped pole piece having an axially opening there through and a second generally disk shaped pole piece having an axially pole piece having an axially opening therethrough, said carrier being disposed through said axially opening of each of said magnet, said first pole piece and said second pole piece, said magnet having a first face and a second face, said first pole piece being disposed on said first face and said second pole piece being disposed on said second face, said first pole further an edge portion extending radially outwardly from said magnet, said second piece further having an edge portion extending radially outwardly from said magnet, said first pole and said second pole being disposed at said edge portion of a respective one of said first pole piece and said second pole piece.

11. A transducer as set forth in claim 7 wherein said case further includes a first end cap disposed at a first end thereof and a second end cap disposed at a second end thereof.

12. A transducer as set forth in claim 11 where each of said first end cap and said second end cap include an elastomeric bumper to limit extreme axially movement of said first assembly.

* * * * *